United States Patent
Keeling et al.

(10) Patent No.: US 10,630,114 B1
(45) Date of Patent: Apr. 21, 2020

(54) METHOD AND SYSTEM FOR MOVING A MAGNETIC FIELD HOT SPOT OF A WIRELESS POWER TRANSFER DEVICE

(71) Applicant: WiTricity Corporation, Watertown, MA (US)

(72) Inventors: Nicholas Athol Keeling, Munich (DE); Leandro Alberto Percebon, Munich (DE)

(73) Assignee: WiTricity Corporation, Watertown, MA (US)

( * ) Notice: Subject to any disclaimer, the term of this patent is extended or adjusted under 35 U.S.C. 154(b) by 0 days.

(21) Appl. No.: 16/197,805

(22) Filed: Nov. 21, 2018

(51) Int. Cl.
| | |
|---|---|
| H02J 7/00 | (2006.01) |
| H02J 50/12 | (2016.01) |
| H01F 38/14 | (2006.01) |
| H02J 7/02 | (2016.01) |
| H02J 50/90 | (2016.01) |
| B60L 53/12 | (2019.01) |
| B60L 53/38 | (2019.01) |
| B60L 53/36 | (2019.01) |
| H02J 50/80 | (2016.01) |

(52) U.S. Cl.
CPC ............ *H02J 50/12* (2016.02); *B60L 53/12* (2019.02); *B60L 53/36* (2019.02); *B60L 53/38* (2019.02); *H01F 38/14* (2013.01); *H02J 7/025* (2013.01); *H02J 50/90* (2016.02); *H02J 50/80* (2016.02)

(58) Field of Classification Search
CPC .. H02J 50/10; H02J 50/12; H02J 5/005; H02J 7/025; B60L 53/12; B60L 53/62; B60L 11/182; B60L 11/1829
USPC ......................................................... 320/108
See application file for complete search history.

(56) References Cited

U.S. PATENT DOCUMENTS

| | | | | |
|---|---|---|---|---|
| 2003/0141950 | A1* | 7/2003 | Kim ........................ | H05K 9/00 335/106 |
| 2007/0228833 | A1* | 10/2007 | Stevens .................... | H02J 5/005 307/45 |
| 2011/0115589 | A1* | 5/2011 | Lindley ............. | H01J 37/32623 335/299 |
| 2014/0266021 | A1* | 9/2014 | Paladeni ................. | H02J 5/005 320/108 |
| 2015/0200548 | A1* | 7/2015 | Covic ..................... | H02J 50/12 307/104 |
| 2015/0260835 | A1 | 9/2015 | Widmer et al. | |
| 2016/0187520 | A1* | 6/2016 | Widmer ................. | G01V 3/101 324/227 |
| 2017/0237290 | A1 | 8/2017 | Bakker et al. | |
| 2018/0083349 | A1 | 3/2018 | Sieber | |

(Continued)

OTHER PUBLICATIONS

"Invitation to Pay Additional Fees", PCT Application No. PCT/US2019/048083, dated Nov. 21, 2019, 9 pages.

(Continued)

*Primary Examiner* — Paul Dinh
(74) *Attorney, Agent, or Firm* — Colby Nipper PLLC

(57) ABSTRACT

In certain aspects, methods and systems for moving a magnetic field hot spot of a wireless power transfer device are disclosed. An example power transfer device generally includes at least one coil configured to generate a charging field, and a controller configured to vary, over time, a current applied to the at least one coil such that magnetic field values of the charging field at a plurality of different positions relative to the at least one coil are configured to change with time.

21 Claims, 9 Drawing Sheets

(56) References Cited

U.S. PATENT DOCUMENTS

2018/0113232 A1* 4/2018 Tompkins ................ G01V 3/10
2018/0212463 A1* 7/2018 van Boheemen ....... B60L 53/12
2018/0304755 A1* 10/2018 Beaver .................... B60L 53/62

OTHER PUBLICATIONS

"International Search Report and Written Opinion", PCT Application No. PCT/US2019/048083, dated Jan. 27, 2020, 18 pages.

\* cited by examiner

METHOD AND SYSTEM FOR MOVING A MAGNETIC FIELD HOT SPOT OF A WIRELESS POWER TRANSFER DEVICE

FIELD

This application is generally related to wireless power charging, and specifically to methods and systems for moving a magnetic field hot spot of a wireless power transfer device.

BACKGROUND

Remote systems, such as vehicles, have been introduced that include locomotion power derived from electricity received from an energy storage device, such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (also referred to as simply "electric vehicles") are often designed to be charged through some type of wired alternating current (AC) such as household or commercial AC supply sources. The wired charging connections involve cables or other suitable connectors that are physically connected to a power supply. Cables and other connectors may sometimes be inconvenient or cumbersome and may have other drawbacks. Wireless power charging systems that are capable of transferring power in free space (e.g., via a wireless field) to charge electric vehicles may overcome some of the deficiencies of wired charging solutions. As such, wireless power charging systems and methods that efficiently and safely transfer power for charging electric vehicles are desirable.

Inductive power transfer (IPT) systems are one means for the wireless transfer of energy. In IPT, a primary (or "base") power device (e.g., a base pad, base wireless charging system, or some other wireless power transmitting device including a power transfer element (e.g., base power transfer element)) transmits power to a secondary (or "pick-up") power receiver device (e.g., a vehicle pad, an electric vehicle wireless charging unit, or some other wireless power receiving device including a power transfer element (e.g., vehicle power transfer element)). Each of the transmitter and receiver power devices includes inductors, typically coils or windings of electric-current-conveying media. An alternating current in the primary inductor of the primary power device produces a fluctuating magnetic field. When the secondary inductor is placed in proximity to the primary inductor, the fluctuating magnetic field induces an electromotive force (EMF) in the secondary inductor, thereby transferring power to the secondary power receiver device.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved wireless power transfer.

Certain aspects of the present disclosure provide a power transfer device for wireless electric charging. The power transfer device generally includes at least one coil configured to generate a charging field, and a controller configured to vary, over time, a current applied to the at least one coil such that magnetic field values of the charging field at a plurality of different positions relative to the at least one coil are configured to change with time.

Certain aspects of the present disclosure provide a power transfer device for wireless electric charging. The power transfer device generally includes at least one coil configured to receive a charging field, a tunable impedance circuit coupled to the at least one coil, and a controller configured to vary, over time, a current induced in the at least one coil by adjusting an impedance of the tunable impedance circuit such that magnetic field values of the charging field at a plurality of different positions relative to the at least one coil are configured to change with time.

Certain aspects of the present disclosure provide a method of wireless electric charging. The method generally includes energizing at least one coil via an applied current or an induced current, and varying, over time, the applied current or the induced current in the at least one coil such that magnetic field values at a plurality of different positions relative to the at least one coil change with time.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

The detailed description set forth below in connection with the appended drawings is intended as a description of exemplary implementations and is not intended to represent the only implementations in which aspects of the present disclosure may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the exemplary implementations. In some instances, some devices are shown in block diagram form.

Example Wireless Power Charging System

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include, besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

Figure 1:
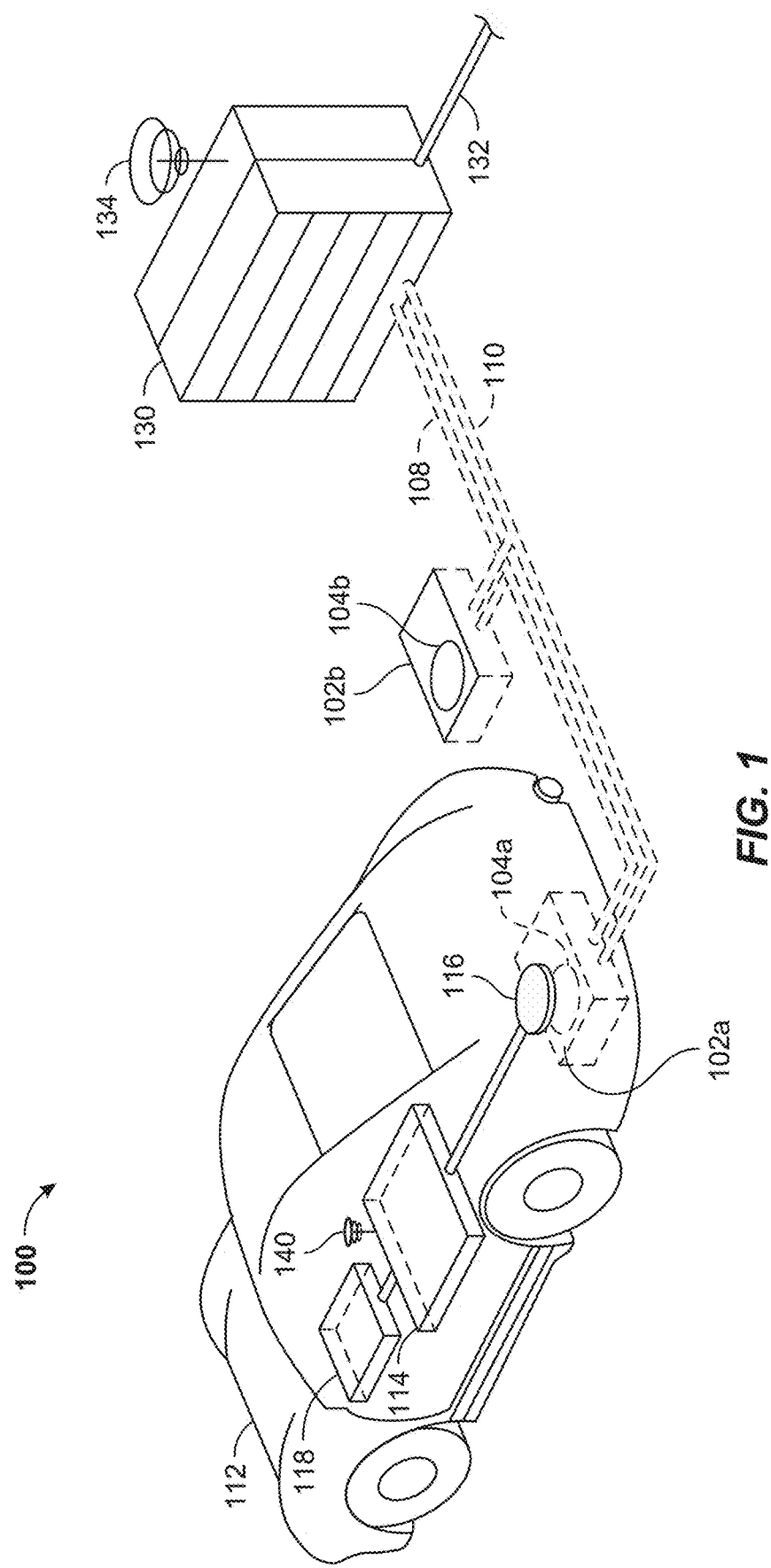
FIG. 1 illustrates a wireless power transfer system for charging an electric vehicle, according to certain aspects of the present disclosure.

FIG. 1 is a diagram of an exemplary wireless power transfer system 100 for charging an electric vehicle, in accordance with some exemplary implementations. The wireless power transfer system 100 enables charging of an electric vehicle 112 while the electric vehicle 112 is parked so as to efficiently couple with a base wireless charging system 102a. Spaces for two electric vehicles are illustrated in a parking area to be parked over corresponding base wireless charging systems 102a and 102b. In some implementations, a local distribution center 130 may be connected to a power backbone 132 and configured to provide an alternating current (AC) or a direct current (DC) supply through a power link 110 to the base wireless charging systems 102a and 102b. Each of the base wireless charging systems 102a and 102b also includes a base power transfer element 104a and 104b, respectively, for wirelessly transferring power. In some other implementations (not shown in FIG. 1), base power transfer elements 104a or 104b may be stand-alone physical units and are not part of the base wireless charging system 102a or 102b.

The electric vehicle 112 may include a battery unit 118, an electric vehicle power transfer element 116, and an electric vehicle wireless charging unit 114. The electric vehicle wireless charging unit 114 and the electric vehicle power transfer element 116 constitute the electric vehicle wireless charging system. In some diagrams shown herein, the electric vehicle wireless charging unit 114 is also referred to as the vehicle charging unit (VCU). The electric vehicle power transfer element 116 may interact with the base power transfer element 104a for example, via a region of the electromagnetic field generated by the base power transfer element 104a.

In some exemplary implementations, the electric vehicle power transfer element 116 may receive power when the electric vehicle power transfer element 116 is located in an electromagnetic field produced by the base power transfer element 104a. The field may correspond to a region where energy output by the base power transfer element 104a may be captured by the electric vehicle power transfer element 116. For example, the energy output by the base power transfer element 104a may be at a level sufficient to charge or power the electric vehicle 112. In some cases, the field may correspond to a "near-field" of the base power transfer element 104a. The near-field may correspond to a region in which there are strong reactive fields resulting from the currents and charges in the base power transfer element 104a that do not radiate power away from the base power transfer element 104a. In some cases the near-field may correspond to a region that is within about $1/2\pi$ of a wavelength of the a frequency of the electromagnetic field produced by the base power transfer element 104a distant from the base power transfer element 104a, as will be further described below.

The electric vehicle power transfer element 116 and base power transfer element 104 as described throughout the disclosed implementations may be referred to or configured as "loop" antennas, and more specifically, multi-turn loop antennas. The elements 104 and 116 may also be referred to herein or be configured as "magnetic" antennas. The term "power transfer element" is intended to refer to a component that may wirelessly output or receive energy for coupling to another "power transfer element." The power transfer element may also be referred to as an "antenna" or a "coupler" of a type that is configured to wirelessly output or receive power. As used herein, power transfer elements 104 and 116 are examples of "power transfer components" of a type that are configured to wirelessly output, wirelessly receive, and/or wirelessly relay power. Loop (e.g., multi-turn loop) antennas may be configured to include an air core or a solid core such as a ferrite core. An air core loop antenna may allow the placement of other components within the core area. Solid core antennas including ferromagnetic or ferrimagnetic materials may allow development of a stronger electromagnetic field and improved coupling.

Local distribution center 130 may be configured to communicate with external sources (e.g., a power grid) via a communication backhaul 134, and with the base wireless charging system 102a via a communication link 108.

In some implementations, the electric vehicle power transfer element 116 may be aligned with the base power transfer element 104a and, therefore, disposed within a near-field region simply by the electric vehicle operator positioning the electric vehicle 112 such that the electric vehicle power transfer element 116 is sufficiently aligned relative to the base power transfer element 104a. Alignment may be considered sufficient when an alignment error has fallen below a tolerable value. In other implementations, the operator may be given visual and/or auditory feedback to determine when the electric vehicle 112 is properly placed within a tolerance area for wireless power transfer. In yet other implementations, the electric vehicle 112 may be positioned by an autopilot system, which may move the electric vehicle 112 until the sufficient alignment is achieved. This may be performed automatically and autonomously by the electric vehicle 112 with or without driver intervention. This may be possible for an electric vehicle 112 that is equipped with a servo steering, radar sensors (e.g., ultrasonic sensors), and intelligence for safely maneuvering and adjusting the electric vehicle. In still other implementations, the electric vehicle 112 and/or the base wireless charging system 102a may have functionality for mechanically displacing and moving the power transfer elements 116 and 104a, respectively, relative to each other to more accurately orient or align them and develop sufficient and/or otherwise more efficient coupling therebetween.

The base wireless charging system 102a may be located in a variety of locations. As non-limiting examples, some suitable locations include a parking area at a home of the electric vehicle owner, parking areas reserved for electric vehicle wireless charging modeled after conventional petroleum-based filling stations, and parking lots at other locations, such as shopping centers and places of employment.

Charging electric vehicles wirelessly may provide numerous benefits. For example, charging may be performed automatically, virtually without driver intervention or manipulation thereby improving convenience to a user. There may also be no exposed electrical contacts and no mechanical wear out, thereby improving reliability of the wireless power transfer system 100. Safety may be improved since manipulations with cables and connectors may not be needed and there may be no cables, plugs, or sockets to be exposed to moisture in an outdoor environment. In addition, there may also be no visible or accessible sockets, cables, or plugs, thereby reducing potential vandalism of power charging devices. Further, since the electric vehicle 112 may be used as distributed storage devices to stabilize a power grid, a convenient docking-to-grid solution may help to increase availability of vehicles for vehicle-to-grid (V2G) operation.

The wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that either the base wireless charging system 102a can transmit power to the electric vehicle 112 or the electric vehicle 112 can transmit power to the base wireless charging system 102a. This capability may be useful to stabilize the power distribution grid by allowing electric vehicles 112 to contribute power to the overall distribution system in times of energy shortfall caused by over demand or shortfall in renewable energy production (e.g., wind or solar).

Figure 2:
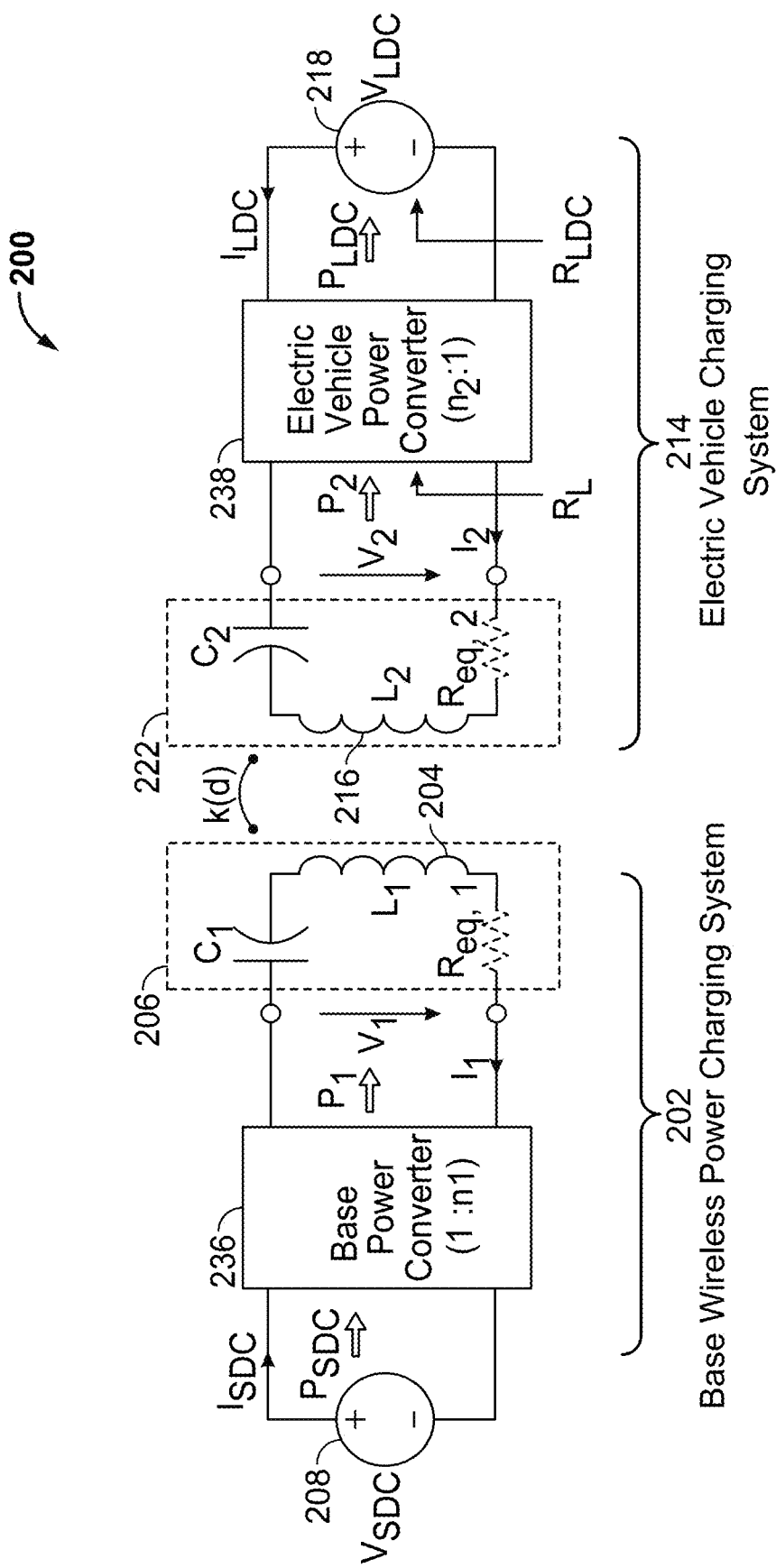
FIG. 2 is a schematic diagram of exemplary components of the wireless power transfer system of FIG. 1, according to certain aspects of the present disclosure.

FIG. 2 is a schematic diagram of exemplary components of a wireless power transfer system 200 similar to that previously discussed in connection with FIG. 1, in accordance with certain aspects of the present disclosure. The wireless power transfer system 200 may include a base resonant circuit 206 including a base power transfer element 204 having an inductance L1. The wireless power transfer system 200 further includes an electric vehicle resonant circuit 222 including an electric vehicle power transfer element 216 having an inductance L2. Implementations described herein may use capacitively loaded conductor loops (i.e., multi-turn coils) forming a resonant structure that is capable of efficiently coupling energy from a primary structure (transmitter) to a secondary structure (receiver) via a magnetic or electromagnetic near-field if both the transmitter and the receiver are tuned to a common resonant frequency. The coils may be used for the electric vehicle power transfer element 216 and the base power transfer element 204. Using resonant structures for coupling energy may be referred to as "magnetically coupled resonance," "electromagnetically coupled resonance," and/or "resonant induction." The operation of the wireless power transfer system 200 will be described based on power transfer from a base power transfer element 204 to an electric vehicle 112 (not shown), but is not limited thereto. For example, as discussed above, energy may be also transferred in the reverse direction.

With reference to FIG. 2, a power supply 208 (e.g., AC or DC) supplies power $P_{SDC}$ to the base power converter 236 as part of the base wireless power charging system 202 to transfer energy to an electric vehicle (e.g., electric vehicle 112 of FIG. 1). The base power converter 236 may include circuitry such as an AC-to-DC converter configured to convert power from standard mains AC to DC power at a suitable voltage level, and a DC-to-low frequency (LF) converter configured to convert DC power to power at an operating frequency suitable for wireless high power transfer. The base power converter 236 supplies power P1 to the base resonant circuit 206 including tuning capacitor C1 in series with base power transfer element 204 to emit an electromagnetic field at the operating frequency. The series-tuned resonant circuit 206 should be construed as exemplary. In another implementation, the capacitor C1 may be coupled with the base power transfer element 204 in parallel. In yet other implementations, the base resonant circuit 206 may be formed of several reactive elements in any combination of parallel or series topology. The capacitor C1 may be provided to form a resonant circuit with the base power transfer element 204 that resonates substantially at the operating frequency. The base power transfer element 204 receives the power P1 and wirelessly transmits power at a level sufficient to charge or power the electric vehicle. For example, the level of power provided wirelessly by the base power transfer element 204 may be on the order of kilowatts (kW) (e.g., anywhere from 1 kW to 110 kW, although actual levels may be or higher or lower).

The base resonant circuit 206 (including the base power transfer element 204 and tuning capacitor C1) and the electric vehicle resonant circuit 222 (including the electric vehicle power transfer element 216 and tuning capacitor C2) may be tuned to substantially the same frequency. The electric vehicle power transfer element 216 may be positioned within the near-field of the base power transfer element and vice versa, as further explained below. In this case, the base power transfer element 204 and the electric vehicle power transfer element 216 may become coupled to one another such that power may be transferred wirelessly from the base power transfer element 204 to the electric vehicle power transfer element 216. The series capacitor C2 may be provided to form a resonant circuit with the electric vehicle power transfer element 216 that resonates substantially at the operating frequency. The series-tuned resonant circuit 222 should be construed as being exemplary. In another implementation, the capacitor C2 may be coupled with the electric vehicle power transfer element 216 in parallel. In yet other implementations, the electric vehicle resonant circuit 222 may be formed of several reactive elements in any combination of parallel or series topology. Element k(d) represents the mutual coupling coefficient resulting at coil separation d. Equivalent resistances Req,1 and Req,2 represent the losses that may be inherent to the base and electric vehicle power transfer elements 204 and 216 and the tuning (anti-reactance) capacitors C1 and C2, respectively. The electric vehicle resonant circuit 222, including the electric vehicle power transfer element 216 and capacitor C2, receives and provides the power P2 to an electric vehicle power converter 238 of an electric vehicle charging system 214.

The electric vehicle power converter 238 may include, among other things, a LF-to-DC converter configured to convert power at an operating frequency back to DC power at a voltage level of the load 218 that may represent the electric vehicle battery unit. The electric vehicle power converter 238 may provide the converted power PLDC to the load 218. The power supply 208, base power converter 236, and base power transfer element 204 may be stationary and located at a variety of locations as discussed above. The electric vehicle load 218 (e.g., the electric vehicle battery unit), electric vehicle power converter 238, and electric vehicle power transfer element 216 may be included in the electric vehicle charging system 214 that is part of the electric vehicle (e.g., electric vehicle 112) or part of its battery pack (not shown). The electric vehicle charging system 214 may also be configured to provide power wirelessly through the electric vehicle power transfer element 216 to the base wireless power charging system 202 to feed power back to the grid. Each of the electric vehicle power transfer element 216 and the base power transfer element 204 may act as transmit or receive power transfer elements based on the mode of operation.

While not shown, the wireless power transfer system 200 may include a load disconnect unit (LDU) (not known) to safely disconnect the electric vehicle load 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle power transfer element 216 to the electric vehicle power converter 238. Disconnecting the electric vehicle power transfer element 216 may suspend charging and also may change the "load" as "seen" by the base wireless power charging system 202 (acting as a transmitter), which may be used to "cloak" the electric vehicle charging system 214 (acting as the receiver) from the base wireless charging system 202. The load changes may be detected if the transmitter includes a load sensing circuit. Accordingly, the transmitter, such as the base wireless charging system 202, may have a mechanism for determining when receivers, such as the electric vehicle charging system 214, are present in the near-field coupling mode region of the base power transfer element 204 as further explained below.

As described above, in operation, during energy transfer towards an electric vehicle (e.g., electric vehicle 112 of FIG. 1), input power is provided from the power supply 208 such that the base power transfer element 204 generates an electromagnetic field for providing the energy transfer. The electric vehicle power transfer element 216 couples to the electromagnetic field and generates output power for storage or consumption by the electric vehicle 112. As described above, in some implementations, the base resonant circuit 206 and electric vehicle resonant circuit 222 are configured and tuned according to a mutual resonant relationship such that the circuits are resonating nearly or substantially at the operating frequency. Transmission losses between the base wireless power charging system 202 and electric vehicle charging system 214 are minimal when the electric vehicle power transfer element 216 is located in the near-field coupling mode region of the base power transfer element 204 as further explained below.

As stated, an efficient energy transfer occurs by transferring energy via a magnetic near-field rather than via electromagnetic waves in the far field, which may involve substantial losses due to radiation into the space. When in the near-field, a coupling mode may be established between the transmit power transfer element and the receive power transfer element. The space around the power transfer elements where this near-field coupling may occur is referred to herein as a near-field coupling mode region.

While not shown, the base power converter 236 and the electric vehicle power converter 238 if bidirectional may both include, for the transmit mode, an oscillator, a driver circuit such as a power amplifier, a filter and matching circuit, and for the receive mode a rectifier circuit. The oscillator may be configured to generate a desired operating frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance as presented by the resonant circuits 206 and 222 to the base and electric vehicle power converters 236 and 238, respectively. For the receive mode, the base and electric vehicle power converters 236 and 238 may also include a rectifier and switching circuitry.

The electric vehicle power transfer element 216 and base power transfer element 204 as described throughout the disclosed implementations may be referred to or configured as "conductor loops," and more specifically, "multi-turn conductor loops" or coils. The base and electric vehicle power transfer elements 204 and 216 may also be referred to herein or be configured as "magnetic" couplers. The term "coupler" is intended to refer to a component that may wirelessly output or receive energy for coupling to another "coupler."

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency.

A resonant frequency may be based on the inductance and capacitance of a resonant circuit (e.g. resonant circuit 206) including a power transfer element (e.g., the base power transfer element 204 and capacitor C2) as described above. As shown in FIG. 2, inductance may generally be the inductance of the power transfer element, whereas, capacitance may be added to the power transfer element to create a resonant structure at a desired resonant frequency. Accordingly, for larger size power transfer elements using larger diameter coils exhibiting larger inductance, the value of capacitance needed to produce resonance may be lower. Inductance may also depend on a number of turns of a coil. Furthermore, as the size of the power transfer element increases, coupling efficiency may increase. This is mainly true if the size of both base and electric vehicle power transfer elements increase. Furthermore a resonant circuit including a power transfer element and tuning capacitor may be designed to have a high quality (Q) factor to improve energy transfer efficiency. For example, the Q factor may be 300 or greater.

As described above, according to some implementations, coupling power between two power transfer elements that are in the near-field of one another is disclosed. As described above, the near-field may correspond to a region around the power transfer element in which mainly reactive electromagnetic fields exist. If the physical size of the power transfer element is much smaller than the wavelength, inversely proportional to the frequency, there is no substantial loss of power due to waves propagating or radiating away from the power transfer element. Near-field coupling-mode regions may correspond to a volume that is near the physical volume of the power transfer element, typically within a small fraction of the wavelength. According to some implementations, magnetic power transfer elements, such as single and multi-turn conductor loops, are preferably used for both transmitting and receiving since handling magnetic fields in practice is easier than electric fields because there is less interaction with foreign objects, e.g., dielectric objects and the human body. Nevertheless, "electric" power transfer elements (e.g., dipoles and monopoles) or a combination of magnetic and electric power transfer elements may be used.

Figure 3:
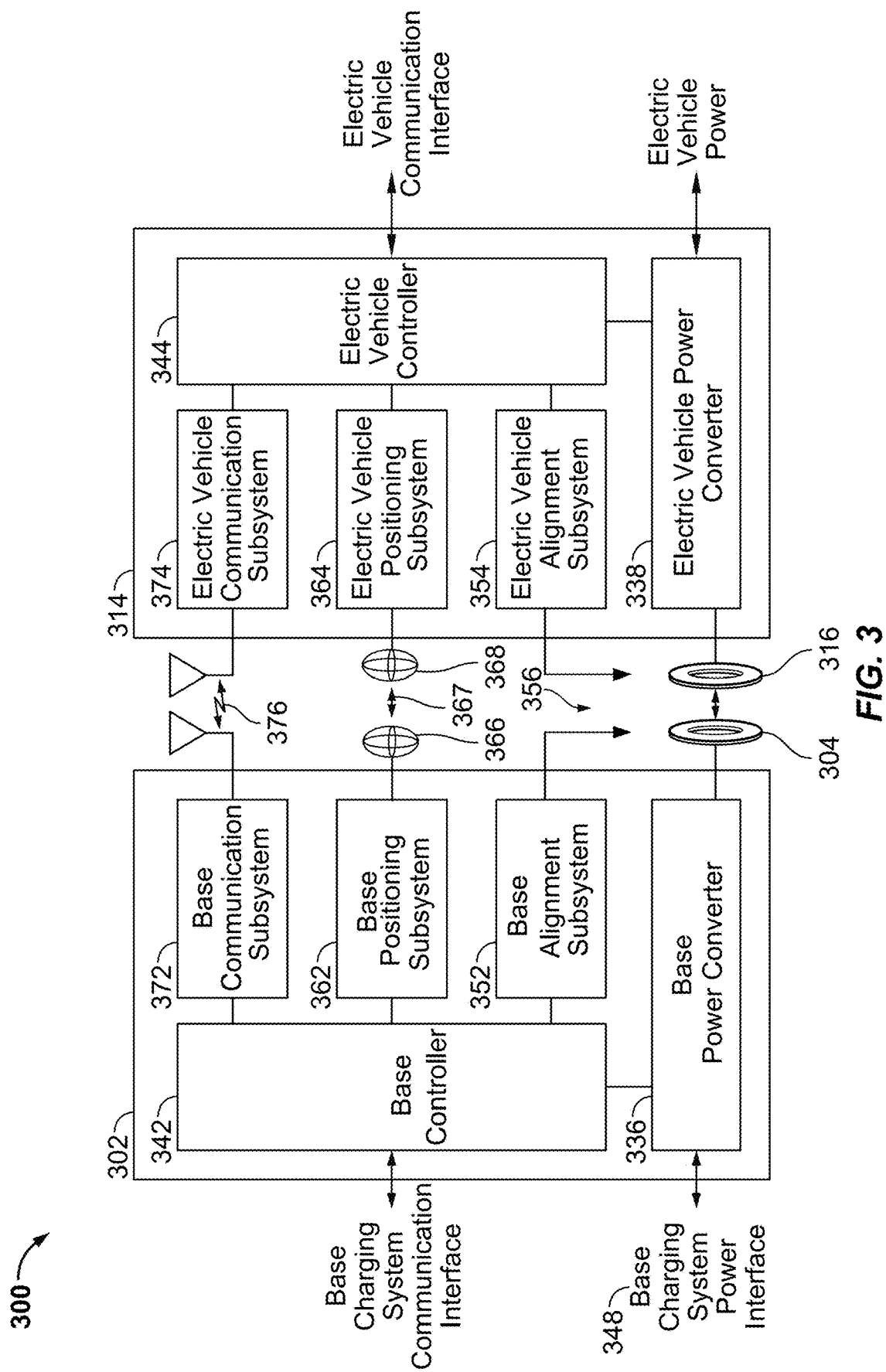
FIG. 3 is a functional block diagram showing exemplary components of the wireless power transfer system of FIG. 1, according to certain aspects of the present disclosure.

FIG. 3 is a functional block diagram showing exemplary components of wireless power transfer system 300, which may be employed in wireless power transfer system 100 of FIG. 1 and/or that wireless power transfer system 200 of FIG. 2 may be part of. The wireless power transfer system 300 illustrates a communication link 376, a positioning link 367, using, for example, a magnetic field signal for determining a position or direction, and an alignment mechanism 356 capable of mechanically moving one or both of the base power transfer element 304 and the electric vehicle power transfer element 316. Mechanical (kinematic) alignment of the base power transfer element 304 and the electric vehicle power transfer element 316 may be controlled by the base alignment subsystem 352 and the electric vehicle alignment subsystem 354, respectively. The positioning link 367 may be capable of bi-directional signaling, meaning that positioning signals may be emitted by the base positioning subsystem or the electric vehicle positioning subsystem or by both. As described above with reference to FIG. 1, when energy flows towards the electric vehicle 112, in FIG. 3 a base charging system power interface 348 may be configured to provide power to a base power converter 336 from a power source, such as an AC or DC power supply (not shown). The base power converter 336 may receive AC or DC power via the base charging system power interface 348 to drive the base power transfer element 304 at a frequency near or at the resonant frequency of the base resonant circuit 206 with reference to FIG. 2. The electric vehicle power transfer element 316, when in the near-field coupling-mode region, may receive energy from the electromagnetic field to oscillate at or near the resonant frequency of the electric vehicle resonant circuit 222 with reference to FIG. 2. The electric vehicle power converter 338 converts the oscillating signal from the electric vehicle power transfer element 316 to a power signal suitable for charging a battery via the electric vehicle power interface.

The base wireless charging system 302 includes a base controller 342 and the electric vehicle wireless charging system 314 includes an electric vehicle controller 344. The base controller 342 may provide a base charging system communication interface to other systems (not shown) such as, for example, a computer, a base common communication (BCC), a communications entity of the power distribution center, or a communications entity of a smart power grid. The electric vehicle controller 344 may provide an electric vehicle communication interface to other systems (not shown) such as, for example, an on-board computer on the vehicle, a battery management system, other systems within the vehicles, and remote systems.

The base communication subsystem 372 and electric vehicle communication subsystem 374 may include subsystems or circuits for specific application with separate communication channels and also for wirelessly communicating with other communications entities not shown in the diagram of FIG. 3. These communications channels may be separate physical channels or separate logical channels. As non-limiting examples, a base alignment subsystem 352 may communicate with an electric vehicle alignment subsystem 354 through communication link 376 to provide a feedback mechanism for more closely aligning the base power transfer element 304 and the electric vehicle power transfer element 316, for example via autonomous mechanical (kinematic) alignment, by either the electric vehicle alignment subsystem 354 or the base alignment subsystem 352, or by both, or with operator assistance.

The electric vehicle wireless charging system 314 may further include an electric vehicle positioning subsystem 364 connected to a magnetic field generator 368. The electric vehicle positioning subsystem 364 may be configured to drive the magnetic field generator 368 with currents that generate an alternating magnetic field. The base wireless charging system 302 may include a magnetic field sensor 366 connected to a base positioning subsystem 362. The magnetic field sensor 366 may be configured to generate a plurality of voltage signals under influence of the alternating magnetic field generated by the magnetic field generator 368. The base positioning subsystem 362 may be configured to receive these voltage signals and output a signal indicative of a position estimate and an angle estimate between the magnetic field sensor 366 and the magnetic field generator 368. These position and angle estimates may be translated into visual and/or acoustic guidance and alignment information that a driver of the electric vehicle may use to reliably park the vehicle. In some implementations, these position and angle estimates may be used to park a vehicle automatically with no or only minimal driver intervention (drive by wire).

Further, electric vehicle controller 344 may be configured to communicate with electric vehicle onboard systems. For example, electric vehicle controller 344 may provide, via the electric vehicle communication interface, position data, e.g., for a brake system configured to perform a semi-automatic parking operation, or for a steering servo system configured to assist with a largely automated parking ("park by wire") that may provide more convenience and/or higher parking accuracy as may be needed in certain applications to provide sufficient alignment between base and electric vehicle power transfer elements 304 and 316. Moreover, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

The wireless power transfer system 300 may also support plug-in charging via a wired connection, for example, by providing a wired charge port (not shown) at the electric vehicle wireless charging system 314. The electric vehicle wireless charging system 314 may integrate the outputs of the two different chargers prior to transferring power to or from the electric vehicle. Switching circuits may provide the functionality as needed to support both wireless charging and charging via a wired charge port.

To communicate between the base wireless charging system 302 and the electric vehicle wireless charging system 314, the wireless power transfer system 300 may use in-band signaling via base and electric vehicle power transfer elements 304, 316 and/or out-of-band signaling via communications systems (372, 374), e.g., via an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

Some communications (e.g., in-band signaling) may be performed via the wireless power link without using specific communications antennas. For example, the base and electric vehicle power transfer elements 304 and 316 may also be configured to act as wireless communication antennas. Thus, some implementations of the base wireless charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base power converter 336 may include a load sensing circuit (not shown) for detecting the presence or absence of active electric vehicle power receivers in the near-field coupling mode region of the base power transfer element 304. By way of example, a load sensing circuit monitors the current flowing to a power amplifier of the base power converter 336, which is affected by the presence or absence of active power receivers in the near-field coupling mode region of the base power transfer element 304. Detection of changes to the loading on the power amplifier may be monitored by the base controller 342 for use in determining whether to enable the base wireless charging system 302 for transmitting energy, to communicate with a receiver, or a combination thereof.

Example Method and System for Moving a Magnetic Field Hot Spot of a Power Transfer Device With respect to induction charging, depending on the energy transfer rate (e.g., power level), operating frequency, size, and design of the primary and secondary magnetic structures (such as a base pad and vehicle pad, respectively) and the distance between them, the flux density in the air gap at one or more locations (each referred to herein as a "magnetic field hot spot" or "hot spot") between the primary and secondary magnetic structures may exceed 0.5 mT and, in some cases, reach 3 to 5 mT. If a foreign object that includes a certain amount of electrically conductive material (e.g., metal) is inserted into the magnetic field hot spots between the primary and secondary magnetic structures, eddy currents may be generated in the foreign object (e.g., due to Lenz's law and Faraday's law of induction), which may lead to power dissipation and subsequent heating effects. The induction heating effect depends on the magnetic flux density, the frequency of the alternating magnetic field, the size, shape, orientation, and conductivity of the foreign object's conducting structure. When the foreign object is exposed to the magnetic field for a sufficient amount of time (e.g., 20 seconds at 5 mT, 30 seconds at 4 mT, or 120 seconds at 3 mT), the foreign object may heat up to temperatures that may be considered hazardous in several regards (e.g., >300° C.).

One hazard may be self-ignition if the object includes flammable materials or if the object is in direct contact with such materials (e.g., a cigarette package including a thin metalized foil). Another hazard may include burning the hand of a person that may pick up such a hot object, e.g., a coin or a key. Another hazard may involve damaging the enclosure of the primary or secondary magnetic structure e.g., an object melting a plastic enclosure. A temperature increase may also be expected in objects, such as ferromagnetic materials, that may be substantially non-conducting, but exhibit a pronounced hysteresis effect or in materials that generate both hysteresis and eddy current losses.

Certain aspects of the present disclosure provide techniques and systems for moving the magnetic field hot spots that are generated by the wireless power transfer device to different positions relative to the power transfer device. For example, a primary magnetic structure (such as a base pad) may shift the hot spots over time to different positions within the air gap between the primary and secondary magnetic structures. Moving the hot spots may allow a foreign object located in the air gap between the primary and second magnetic structures to cool off before reaching a hazardous temperature. A magnetic field hot spot may include a position, within a charging field, having a magnetic field value that exceeds the average or median value of the charging field.

Figure 4:
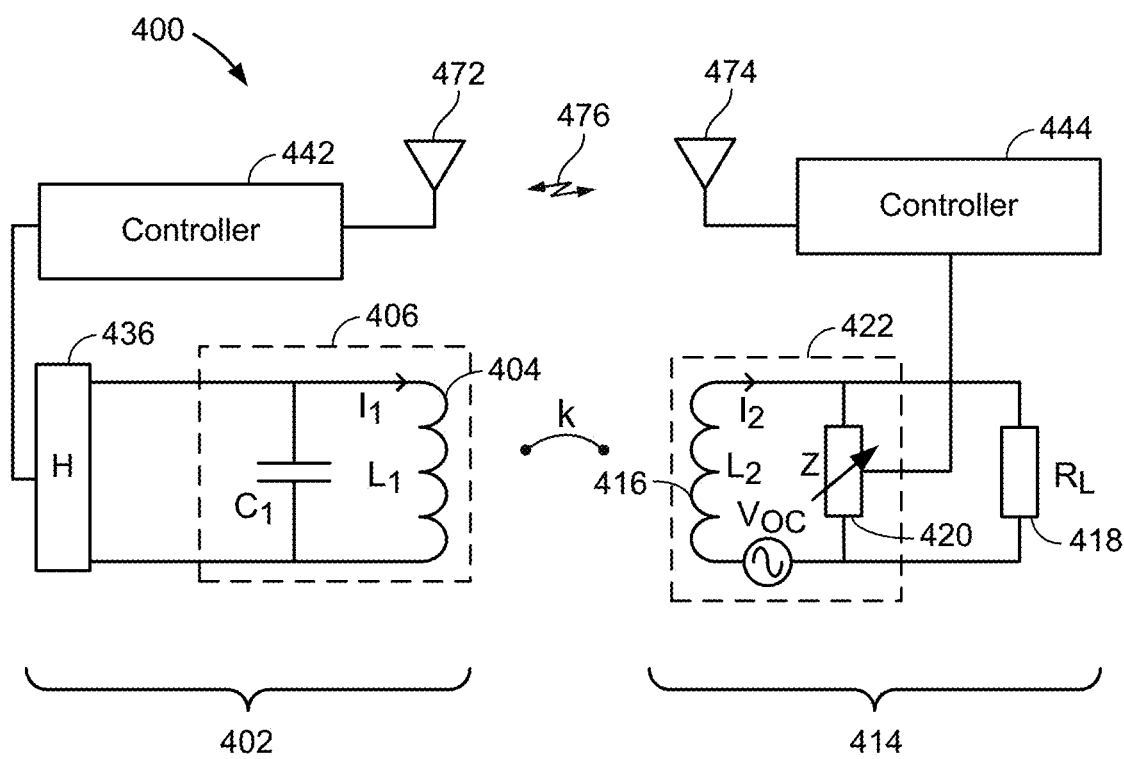
FIG. 4 is a diagram of an example wireless power transfer system employed to move magnetic field hot spots, according to certain aspects of the present disclosure.

FIG. 4 illustrates a diagram of an example wireless power transfer system 400, in accordance with certain aspects of the present disclosure. As shown, the wireless power transfer system 400 includes a base wireless power charging system 402 and a vehicle charging system 414. The base wireless power charging system 402 may include a base resonant circuit 406 including a base power transfer element 404 having an inductance $L_1$. The base power transfer element 404 may be implemented as conductor loops (e.g., two coils forming a double-D coil) having single or multi-turn coils.

The base wireless power charging system 402 may also include a base power converter 436. The base power converter 436 may be coupled to and controlled by a base controller 442 (such as the base controller 342 of FIG. 3). Similar to FIG. 2, the base power converter 436 may include circuitry such as an AC-to-DC converter configured to convert power from AC to DC power at a suitable voltage level, and a DC-to-low frequency (LF) converter configured to convert DC power to power at an operating frequency suitable for wireless high power transfer. The base power converter 436 supplies power to the base resonant circuit 406 including tuning capacitor $C_1$ in parallel (or in series as depicted in FIG. 2) with base power transfer element 404 to emit an electromagnetic field at the operating frequency.

The electric vehicle charging system 414 includes a vehicle resonant circuit 422 including a vehicle power transfer element 416 having an inductance $L_2$. The vehicle power transfer element 416 may be implemented as conductor loops (e.g., a double-D coil) having single or multi-turn coils. The electric vehicle resonant circuit 422, including the electric vehicle power transfer element 416 and a tunable impedance circuit 420, receives and provides power to an electrical load 418 of the electric vehicle charging system 414. The tunable impedance circuit 420 may be coupled to and controlled by a vehicle controller 444 (such as the electric vehicle controller 344 of FIG. 3). The electrical load 418 may include a power converter (such as a LF-to-DC converter configured to convert power at an operating frequency to DC power) electrically coupled to a battery unit. The base power transfer element 404 and vehicle power transfer element 416 may have a mutual inductance with a mutual coupling coefficient k.

The base wireless power charging system 402 may include a base communication subsystem 472. The base communication subsystem 472 may be coupled to the base controller 442 and used to communicate with the electric vehicle charging system 414 via a vehicle communication subsystem 474, which is coupled to the vehicle controller 444. The communication subsystems 472, 474 may include various wireless communication components including a wireless transmitter, wireless receiver, wireless transceiver, and/or antenna. The base wireless power charging system 402 and electric vehicle charging system 414 may communicate with each other via a communication link 476 facilitated by the communication subsystems 472, 474. As an example, the communication subsystems 472, 474 may send and/or receive data related to a current induced in or current applied to the base power transfer element 404 or the vehicle power transfer element 416 as further described herein.

Figure 5:
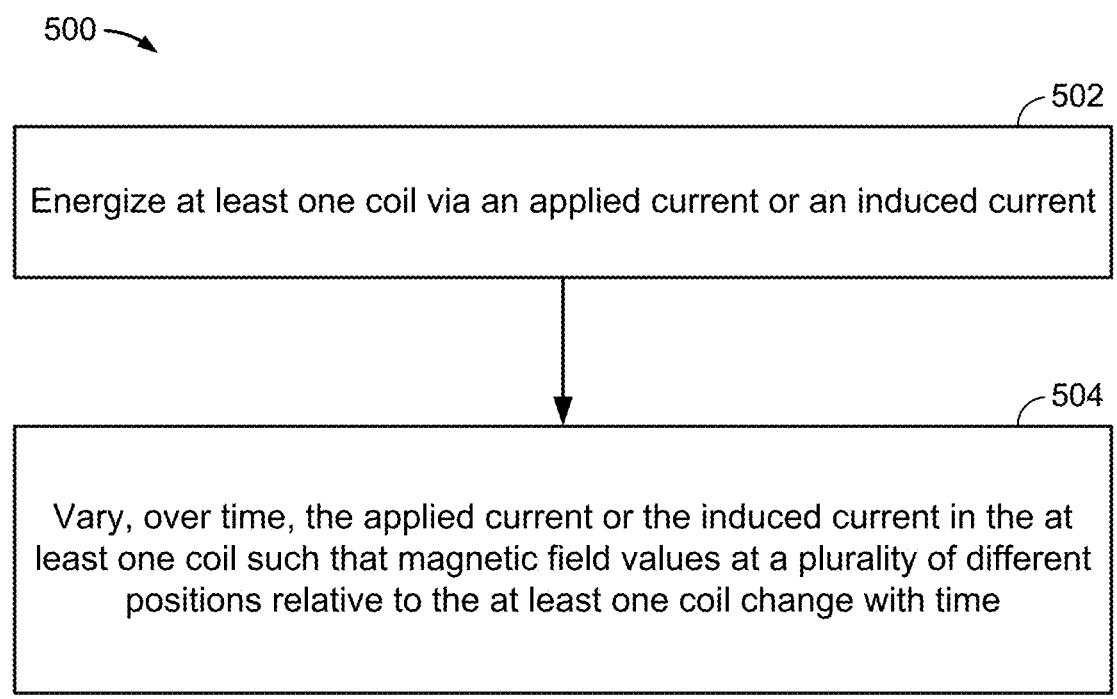
FIG. 5 is a flowchart illustrating example operations for moving a magnetic field hot spot while wirelessly charging, in accordance with certain aspects of the present disclosure.

FIG. 5 is a flowchart illustrating example operations 500 for moving a magnetic field hot spot while wirelessly charging, in accordance with certain aspects of the present disclosure. For example, the operations 500 may be performed by a power transfer device (such as the base wireless power charging system 402 or vehicle charging system 414 depicted in FIG. 4).

Operations 500, begin at block 502, with a power transfer device (e.g., a base pad or a vehicle pad) energizing at least one coil via an applied current or an induced current. At block 504, the power transfer device may vary, over time, the applied current or the induced current in the at least one coil such that magnetic field values at a plurality of different positions relative to the at least one coil change with time.

In accordance with certain aspects, the power transfer device (e.g., a base pad) may vary, over time, a current applied to the at least one coil such that magnetic field values of the charging field at a plurality of different positions relative to the at least one coil are configured to change with time. For example, the base controller 442 may be configured to vary, over time, the current applied to the at least one coil by controlling the phase, magnitude, and/or operating frequency of the current generated by the base power converter 436.

In other aspects, the power transfer device (e.g., a vehicle pad) may vary, over time, a current induced in the at least one coil by adjusting an impedance of the tunable impedance circuit such that magnetic field values of the charging field at a plurality of different positions relative to the at least one coil are configured to change with time. For instance, the vehicle controller 444 may be configured to vary, over time, the current induced in the at least one coil by adjusting an impedance of the tunable impedance circuit 420. The tunable impedance circuit may include various circuits to adjust the impedance, capacitance, inductance, and/or resistance of the tunable impedance circuit. As an example, the tunable impedance circuit may include a tunable capacitor and/or a tunable resistor. The tunable impedance circuit may enable the vehicle pad to adjust the amount of current that can be induced in the coil (such as the vehicle power transfer element 416).

The power transfer device may vary the current according to a predetermined pattern and/or oscillation frequency. The predetermined current pattern may vary the current over time according to the oscillation frequency. As an example, the predetermined current pattern may cycle consecutively through a sequence of currents (e.g., a time series of currents), where each current may be applied to the at least one coil for an interval (e.g., 1 second) of applying the oscillating signal at a particular frequency. The sequence of currents may include different current values (e.g., peak current values or root-mean-square (RMS) current values) selected to move the highest magnetic field values of the charging field to different positions between the base pad and vehicle pad. The sequence of currents may be ordered according to any suitable function and, as such, may increase, decrease, or change cyclically (e.g., sinusoidally) over time. In other aspects, the sequence of currents may be generated by a random function. The sequence of currents for the base pad may be different from the sequence of currents for the vehicle pad. For instance, the sequence of currents used for the base pad may increase for a certain period while the sequence of currents used for the vehicle pad may decrease for the same period, or vice versa.

The oscillation frequency may be the rate at which the power transfer device varies the current over time. The oscillation frequency may be a slow changing frequency that enables a foreign object located between two power transfer devices (such as a base pad and vehicle pad) to cool off and avoid reaching a hazardous temperature. For instance, the oscillation frequency may be equal to or less than 1 Hz. In other aspects, the oscillation frequency may be in a range from 1 Hz to 100 Hz (e.g., 2 Hz or 5 Hz). The oscillation frequency for the current may be different from the operating frequency of the LF current (e.g., the carrier signal) applied to the power transfer element (e.g., the base power transfer element 404). As an example, the power transfer device may modulate, in amplitude (e.g., amplitude modulation), the LF current carrier signal with the predetermined current pattern according to the oscillation frequency.

The power transfer device may vary the current to maintain the magnetic field values at or below a first threshold value. In other aspects, the power transfer device may vary the current to maintain the magnetic field values at or above a second threshold value, which may be the same as or different than the first threshold. For example, the power transfer device may move the magnetic field hot spot around by allowing portions of an existing hot spot to fall below or to the first threshold value (e.g., less than or equal to 2 mT) and other positions to rise to the level of being a new hot spot (e.g., greater than or equal to 2 mT).

In certain aspects, the vehicle pad may transmit via a wireless transmitter (such as the wireless transmitter included in the communication subsystem 474) an indication of the current induced in the coil of the vehicle pad by the charging field. The base pad may receive via a wireless receiver (such as the wireless receiver included in the communication subsystem 472) the indication of the current induced in the coil of the vehicle pad by the charging field, and the base pad may vary the applied current based on the received indication. For example, the base pad may, based on a determination that the induced current is increasing in the vehicle pad, reduce the magnitude of the current applied to the coil of the base pad. The indication of the induced current may include information related to the predetermined current pattern, the sequence of currents, ampere-turns of a power transfer element, a magnitude of the current, an amplitude of the current, and/or an RMS value of the current.

The base pad may transmit via a wireless transmitter (such as the wireless transmitter included in the communication subsystem 472) an indication of the current applied to the coil of the base pad to generate the charging field. The vehicle pad may receive via a wireless receiver (such as the wireless receiver included in the communication subsystem 474) the indication of the current applied to the coil of the base pad, and the vehicle pad may vary the induced current based on the received indication. For example, the vehicle pad may, based on a determination that the applied current is increasing in the base pad, reduce the magnitude of the current induced in the coil of the vehicle pad by adjusting the tunable impedance circuit. The indication of the applied current may include information related to the predetermined current pattern, the sequence of currents, ampere-turns of a power transfer element, a magnitude of the current, an amplitude of the current, and/or an RMS value of the current.

Figure 6:
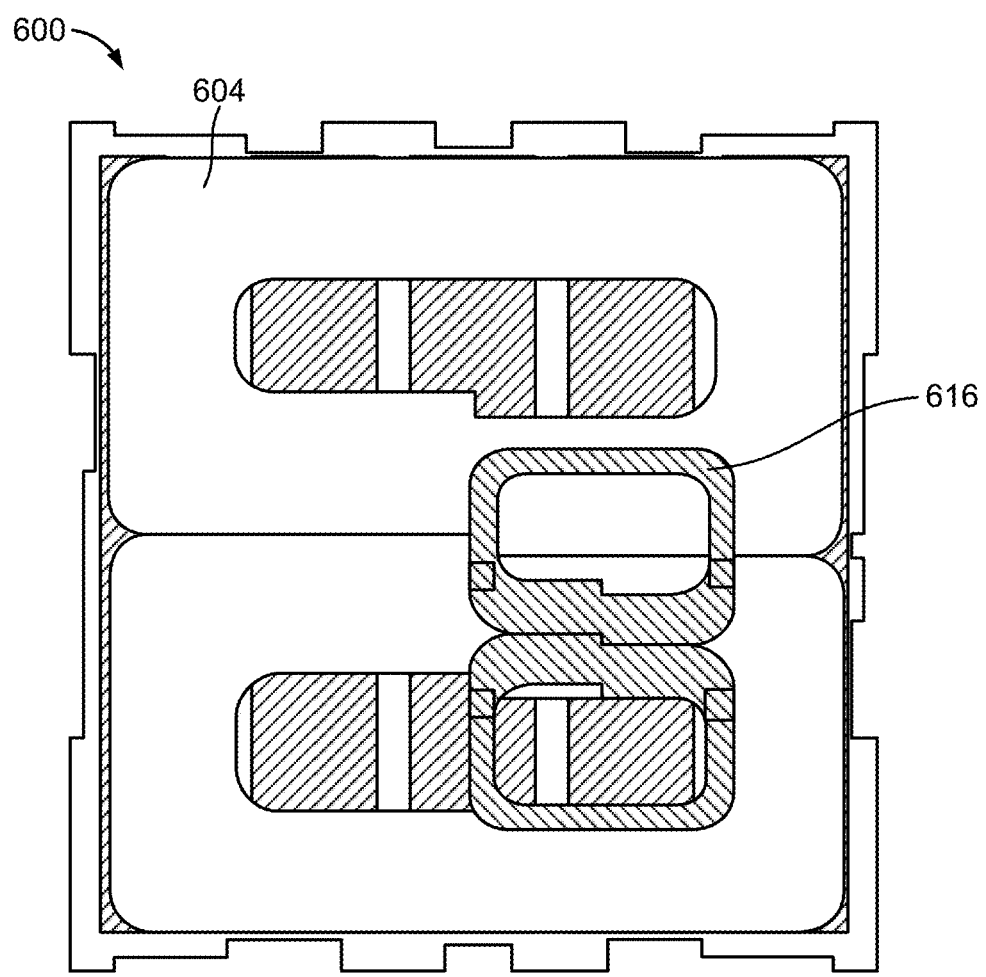
FIG. 6 illustrates a top view of an example wireless power transfer system that implements the techniques described herein for moving a magnetic field hot spot during a wireless charging operation, in accordance with certain aspects of the present disclosure.

FIG. 6 depicts a top view of an example wireless power transfer system 600 that implements the techniques described herein for moving a magnetic field hot spot during a wireless charging operation, in accordance with certain aspects of the present disclosure. As shown, the wireless power transfer system 600 includes a base power transfer element 604 and a vehicle power transfer element 616 disposed above the base power transfer element 604. In this example, the base power transfer element 604 and vehicle power transfer element 616 are both double-D coil elements. The vehicle power transfer element 616 is positioned off center from the base power transfer element 604 such that the vehicle power transfer element 616 is closer to the bottom right corner of the base power transfer element 604 than the respective top left corner of FIG. 6. As further illustrated in FIGS. 7-9, the hot spot may be moved using the techniques described herein even in cases where the vehicle pad and base pad are not optimally aligned, as illustrated in FIG. 6.

Figure 7:
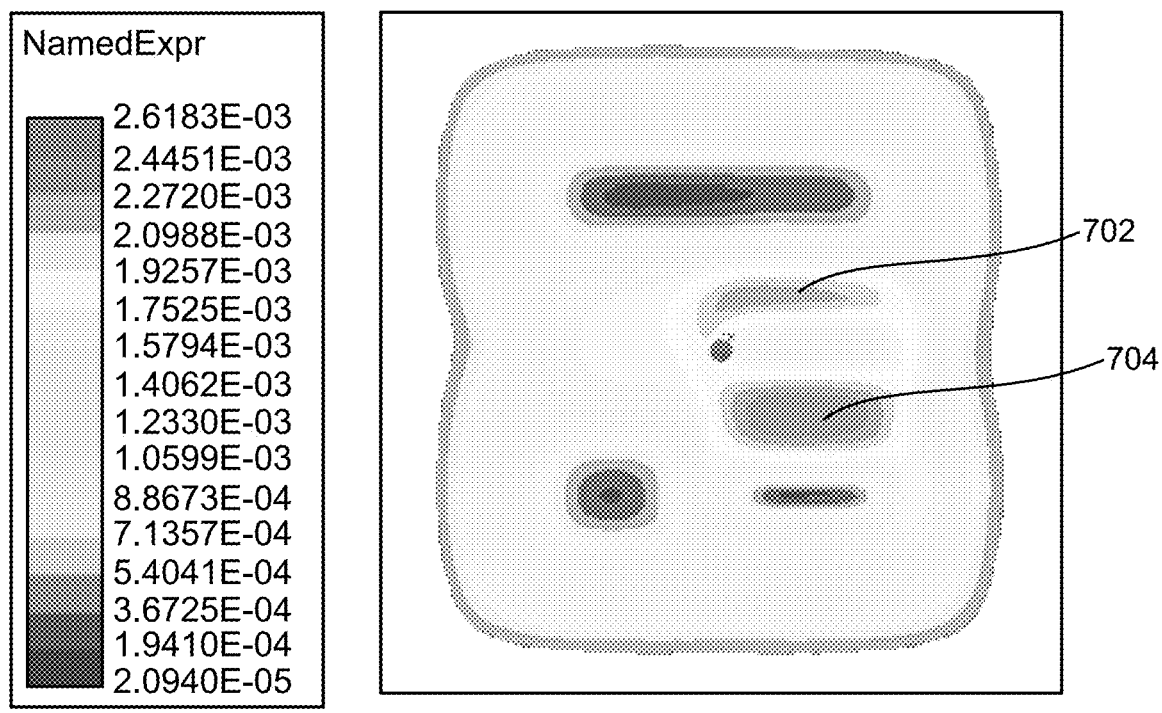
FIG. 7 illustrates an example contour graph of magnetic field values controlled by the wireless power transfer system of FIG. 6 to have a hot spot in a first position, in accordance with certain aspects of the present disclosure.

FIG. 7 illustrates an example contour graph of magnetic field values controlled by the wireless power transfer system 600 of FIG. 6 to have a hot spot in a first position, in accordance with certain aspects of the present disclosure. As shown, the contour graph depicts a top view of the magnetic field values in a plane located between the base power transfer element 604 and vehicle power transfer element 616. In this example, two hot spots 702 and 704 having magnetic field values above 2 mT are formed when the base power transfer element 604 has about 100 more ampere-turns than the vehicle power transfer element 616. Ampere-turns may be a product of the number turns in a coil (e.g., the base power transfer element 604 or the vehicle power transfer element 616) and the current in amperes that flows through the coil. As expected, the hot spots 702 and 704 are concentrated around the area directly below the vehicle power transfer element 616 illustrated in FIG. 6.

Figure 8:
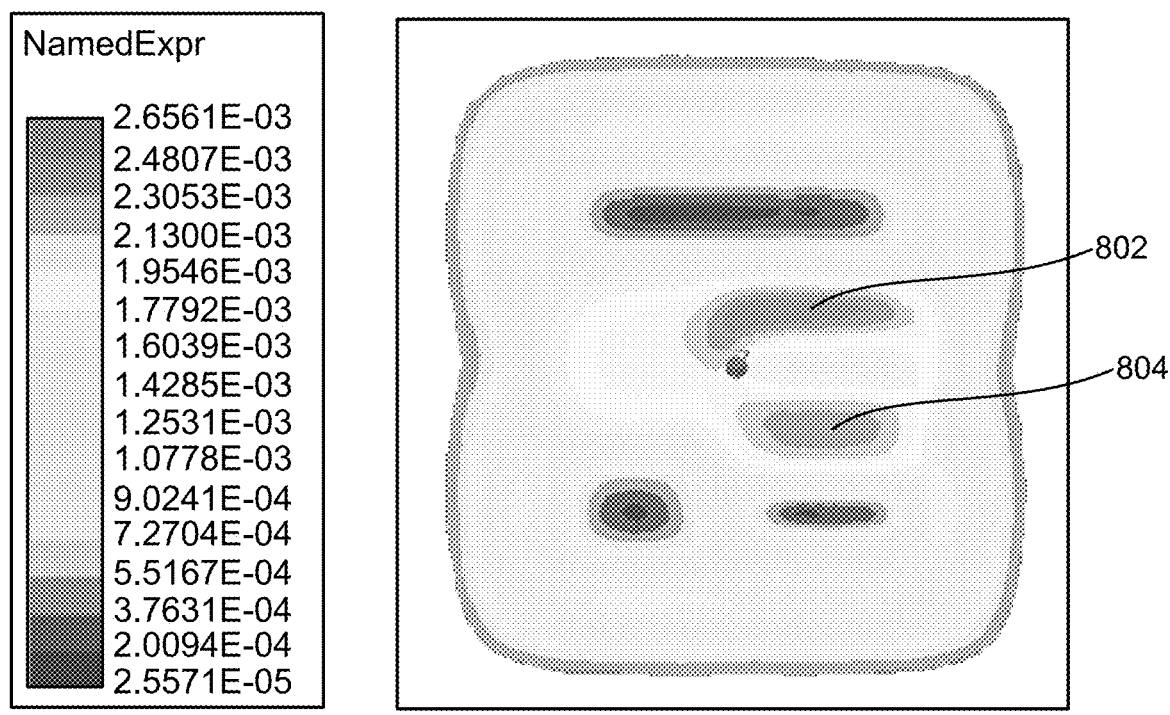
FIG. 8 illustrates an example contour graph of magnetic field values controlled by the wireless power transfer system of FIG. 6 to have a hot spot in a second position, in accordance with certain aspects of the present disclosure.

FIG. 8 illustrates an example contour graph of magnetic field values controlled by the wireless power transfer system 600 of FIG. 6 to move the hot spot to a second position, in accordance with certain aspects of the present disclosure. As shown, the contour graph depicts a top view of the magnetic field values in a plane located between the base power transfer element 604 and vehicle power transfer element 616. In this example, two hot spots 802 and 804 having magnetic field values above 2 mT are formed when the base power transfer element 604 has about 20 more ampere-turns than the vehicle power transfer element 616. The hot spot 802 has increased in size relative to the hot spot 702, whereas the hot spot 804 has decreased in size relative to the hot spot 704.

Figure 9:
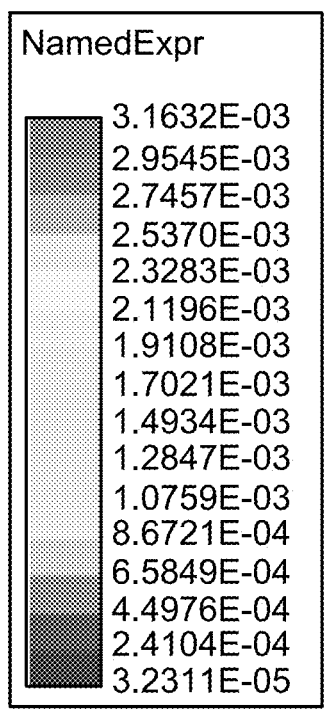
FIG. 9 illustrates an example contour graph of magnetic field values controlled by the wireless power transfer system of FIG. 6 to have a hot spot in a third position, in accordance with certain aspects of the present disclosure.
Figure 9:
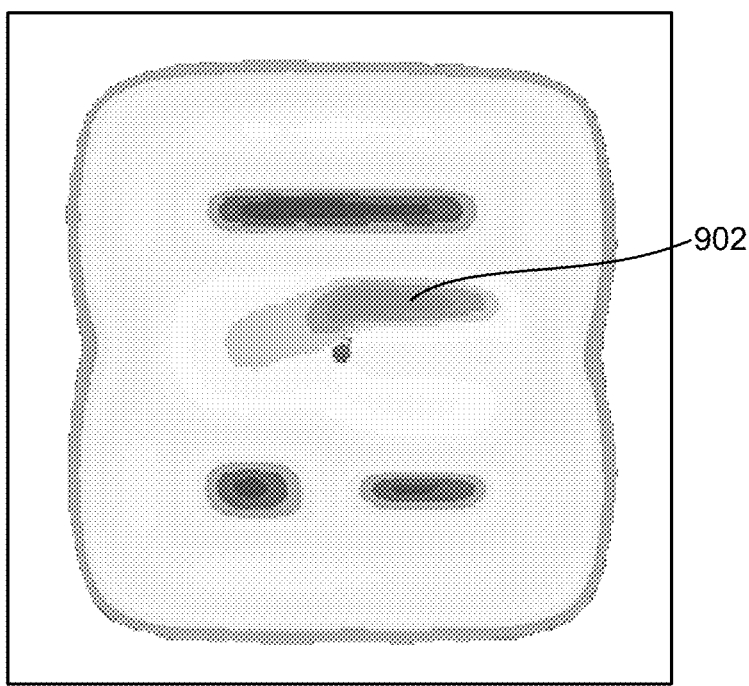

FIG. 9 illustrates an example contour graph of magnetic field values the controlled by wireless power transfer system 600 of FIG. 6 to move the hot spot to a third position, in accordance with certain aspects of the present disclosure. As shown, the contour graph depicts a top view of the magnetic field values in a plane located between the base power transfer element 604 and vehicle power transfer element 616. In this example, a single hot spot 902 is formed when the base power transfer element 604 has over 70 fewer ampere-turns than the vehicle power transfer element 616. The hot spot 902 has increased in area relative to the hot spot 802, whereas the second hot spot is no longer present. FIGS. 7-9 demonstrate that the hot spots generated by the base power transfer element 604 and vehicle power transfer element 616 may be moved over time using the techniques described herein to allow foreign objects to cool off and avoid overheating.

The methods and systems described herein provide various improvements to wireless electric charging. In certain aspects, slowly moving the magnetic field hot spots that are generated by a wireless power transfer device to different positions relative to the power transfer device enables foreign objects located in the air gap between power transfer devices (e.g., a base pad and a vehicle pad) to cool off before reaching hazardous temperatures. The methods and systems described herein may avoid self-ignition of the foreign object, damage to the power transfer device, and/or injury to individuals that may touch to the foreign object.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function.

Means for energizing a coil may comprise a power converter, such as the base power converter 436 of FIG. 4, and/or a power transfer element, such as the base power transfer element 404 of FIG. 4. Means for varying a current may comprise a power converter, such as the base power converter 436 of FIG. 4, and/or a tunable impedance circuit, such as the tunable impedance circuit 420 of FIG. 4.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c"

is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a power transfer device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the functions of the communication subsystem. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the power transfer device, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 5.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A power transfer device comprising:
   at least one coil configured to generate a charging field; and
   a controller configured to apply a sequence of currents having different peak current values to the at least one coil, each current in the sequence of currents being selected to move a magnetic field hot spot corresponding to the charging field from a first position relative to the at least one coil to a second position relative to the at least one coil, the magnetic field hot spot comprising an area that is within the charging field and that has a magnetic field strength exceeding a threshold value.

2. The power transfer device of claim 1, wherein the controller is configured to apply the sequence of currents according to a predetermined current pattern.

3. The power transfer device of claim 1, wherein the controller is configured to apply the sequence of currents according to an oscillation frequency.

4. The power transfer device of claim 3, wherein the oscillation frequency is in a range from 1 Hz to 100 Hz.

5. The power transfer device of claim 3, wherein the oscillation frequency is equal to or less than 1 Hz.

6. The power transfer device of claim 1, wherein the controller is configured to apply the sequence of currents to maintain the magnetic field values below a threshold value.

7. The power transfer device of claim 1, further comprising a wireless receiver, wherein the controller is configured to apply the sequence of currents based on an indication of an additional current induced in an additional coil by the charging field, the indication being received via the receiver.

8. The power transfer device of claim 1, wherein the at least one coil comprises two coils forming a double-D coil.

9. A power transfer device comprising:
   at least one coil configured to receive a charging field;
   a tunable impedance circuit coupled to the at least one coil; and
   a controller configured to move one or more magnetic field hot spots to different positions relative to the at least one coil over a duration of time by adjusting an impedance of the tunable impedance circuit during the duration of time to vary peak current values of a current induced in the at least one coil, the one or more magnetic field hot spots comprising one or more areas within the charging field that correspond to magnetic field values exceeding a threshold value.

10. The power transfer device of claim 9, wherein the controller is configured to vary the peak current values of the current according to a predetermined current pattern.

11. The power transfer device of claim 9, wherein the controller is configured to vary the peak current values of the current according to an oscillation frequency.

12. The power transfer device of claim 11, wherein the oscillation frequency is in a range from 1 Hz to 100 Hz.

13. The power transfer device of claim 11, wherein the oscillation frequency is equal to or less than 1 Hz.

14. The power transfer device of claim 9, wherein the controller is configured to vary the peak current values of the current to maintain the magnetic field values below the threshold value.

15. The power transfer device of claim 9, further comprising a wireless transmitter configured to transmit an indication of the current induced in at least one coil by the charging field.

16. The power transfer device of claim 9, wherein the at least one coil comprises two coils forming a double-D coil.

17. A method of wireless electric charging, comprising:
   energizing at least one coil via an applied current or an induced current; and
   varying the applied current or the induced current in the at least one coil by:
      adjusting a magnitude of the applied current or the induced current; and
      causing, based on the adjusting of the magnitude, a magnetic field hot spot within a charging field to move from a first position relative to the at least one coil to a second position relative to the at least one coil, the magnetic field hot spot comprising an area that is within the charging field and that has a magnetic field strength exceeding a threshold value.

18. The method of claim 17, wherein adjusting the magnitude of the applied current or the induced current comprises adjusting the magnitude of the applied current or the induced current according to a predetermined current pattern.

19. The method of claim 17, wherein adjusting the magnitude of the applied current or the induced current comprises oscillating the applied current or the induced current according to an oscillation frequency.

20. The method of claim 17, wherein adjusting the magnitude of the applied current or the induced current comprises adjusting the magnitude of the applied current or the induced current to allow:
   a first set of magnetic field values corresponding to a portion of the magnetic field hot spot to fall below the threshold value; and
   a second set of magnetic field values corresponding to another portion of the charging field to rise at least to the threshold value to form a new magnetic field hot spot.

21. The power transfer device of claim 1, wherein the threshold value is approximately 2 mT.

* * * * *